May 15, 1934.    J. C. HANSEN ET AL    1,958,996
OPTICAL SYSTEM FOR SOUND REPRODUCERS
Filed Nov. 28, 1931

INVENTORS
JOHN C. HANSEN
BURNETTE-L. HUBBARD
BY
ATTORNEY

Patented May 15, 1934

1,958,996

UNITED STATES PATENT OFFICE 1,958,996

OPTICAL SYSTEM FOR SOUND REPRODUCERS

John C. Hansen, Collingswood, and Burnette L. Hubbard, Haddon Heights, N. J., assignors to Radio Corporation of America, a corporation of Delaware Application November 28, 1931, Serial No. 577,784

10 Claims. (Cl. 88—24)

This invention relates to an improvement in optical systems such as are used in photoelectric sound reproducing devices, and to an improved mounting for such an optical system which places and maintains the lenses in correct relation to each other.

In sound reproducing devices of the photoelectric types which are customarily used in talking motion picture apparatus, etc., it is necessary to focus a brilliant, narrow line of light upon the sound track of the film, and this line of light must have a width of the order of magnitude of one one-thousandth of an inch and a length of about one-tenth of an inch.

Heretofore this has been accomplished in various ways, such as forming a reduced image of an illuminated slit by means of a microscope objective, or the equivalent, or by the use of a very narrow slit placed close to the film and brightly illuminated. The latter of these methods is unsatisfactory on account of the difficulty of producing a sufficiently minute slit and of illuminating it, and further difficultes are encountered due to the dirt from the film, etc. filling up at the slit and obstructing the light; also wear of the film by contact of the slit, and wear of the slit itself from such a contact. In the present invention we have provided an optical system which produces a sufficiently fine and brilliant line of light upon the film without the use of any mechanical slit or its equivalent, and we have further provided a mounting for such an optical system which is inexpensive and at the same time holds the parts of the system in predetermined relation to each other and to the rest of the sound reproducer.

One object of the invention is the provision of an inexpensive but accurate optical system.

Another object of the invention is the provision of an extremely inexpensive but extremely accurate mounting for such an optical system.

Another object of the invention is the provision of an optical system so designed that commercial glass rod can be used for the lenses.

Another object of the invention is the provision of a lens mounting of such construction that stamped or drawn parts may be used in the manufacture thereof.

Another object of the invention is the provision of an optical system of the kind described, and a mounting therefor which will at all times maintain a linear image transversely of the sound track.

Figure 1:
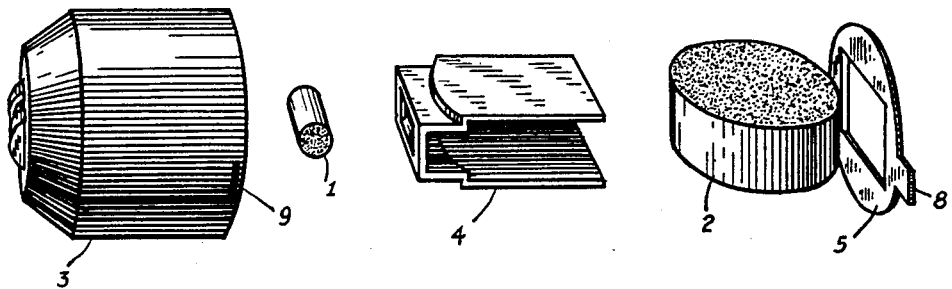
Fig. 1 is an exploded view of the optical system and the mounting therefor.
Figure 2:
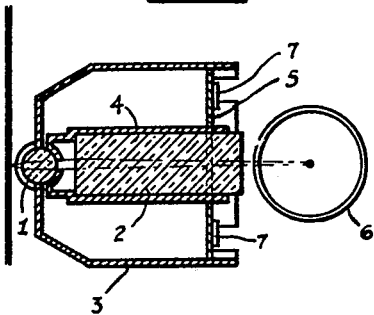
Fig. 2 is a section taken in the direction of movement of the film through the system and mounting as assembled.

This optical system consists, as shown in Fig. 2, of a small cylindrical lens 1 which is of very small diameter and therefore of short focal length, and a second cylindrical lens 2 which serves as a condenser lens and is of considerably longer focal length.

The lens 1 is preferably about one-eighth of an inch in diameter and therefore has a focal distance, as measured from the face of the lens to the film, of approximately one twenty-fourth of an inch or thereabouts. This lens is stopped down by a slit in front of the member 4, which is shown particularly in Fig. 2, to approximately one-third of its diameter or, in other words, the slit is about one twenty-fourth of an inch wide and this stopping down of the aperture of the lens eliminates the portion producing objectionable spherical aberrations and leaves in use only the most desirable portions of the lens. Due to the extremely short focal length, the remaining aberrations of the lens become negligible and an uncorrected lens consisting of a short piece of glass rod is sufficiently accurate to produce a linear image approximately .0008 of an inch in width (which width is determined by the appropriate selection of the exciter lamp 6) without the production of any undue "fuzziness" of the image from spherical aberrations and with no noticeable chromatic aberrations. This lens, of course, as shown in Fig. 2 images the filament of the exciter lamp 6 upon the film in one plane only.

The lens 2 which serves as a condenser lens is stopped down to an effective aperture of approximately half its diameter by the member 5, and this lens serves to collect the light transversely of the film and thereby increases the brightness of the image focussed by the lens 1. The lens 2 is so placed as to focus an image approximately in the plane of the film but, since the exciter lamp as ordinarily used is provided with a linear coil filament, it is undesirable for the image in this plane to be too accurately formed and the lens is therefore either placed slightly out of focus or is provided with a sufficiently large linear aperture so that the spherical aberration of the lens produces a fuzziness of the images of the coils in this direction sufficient to produce uniform illumination of the line.

It will be apparent that in order for this system to function properly the lens 1 must be at all times maintained with its axis transverse to the plane of travel of the film, while the axes of the lenses 1 and 2 must be at right angles to each other, and we accomplish this result effectively and inexpensively by the mounting shown.

Figure 3:
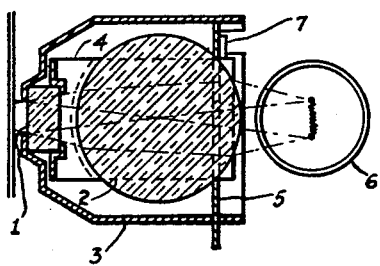
Fig. 3 is a section at right angles to Fig. 2.

This mounting consists of a casing 3, an intermediate lens holding member 4, and a rear cover 5. The casing 3 is provided with the curved extension shown on its front face into which the lens 1 fits as shown in Figs. 2 and 3, and this extension is provided with a slot in its middle portion which defines the length of the line of light produced upon the film. The lens 1 lies snugly into this extension and is pressed thereagainst by the member 4 which, as shown, is provided with a similarly rounded depression into which the lens fits accurately and which is provided with an aperture serving as a diaphragm as before referred to. The member 4 is thus at all times maintained in a predetermined relation to the lens 1.

The rear portion of the member 4 is provided with a pair of recesses in its legs, which are relatively springy, into which the lens 2 fits, and since the lens 2 not only has its upper and lower faces perpendicular to its axis and contacting with the legs of the member 4, but also has its periphery snugly in contact with the recesses, it will always be maintained accurately in proper relation to the lens 1.

The member 5 is provided with an aperture just sufficiently large to pass over the member 4 and which is provided at its ends with beveled faces to contact with the lens 2. This member 5 is further provided with an extended tongue, as shown, which is adapted to slide in a keyway or similar recess in the sound reproducer. When the device is assembled as shown in Figs. 2 and 3, this member 5 presses snugly against the rear face of the lens 2, being held thereagainst by the bent-in lugs 7 shown in Figs. 2 and 3, and the tongue 8 projects through the aperture 9 in the casing 3. Due to this contact with the surfaces of the member 4 and also with the periphery of the lens 2, the member 5 will at all times be in predetermined relation to the lens 2 and therefore also to the lens 1 as hereinbefore described, and the pressure of the lugs 7 thereagainst will maintain the entire assembly in such relation; and the tongue 8 projecting through the aperture 9 in the keyway already described will therefore maintain the lenses 1 and 2 in the required relation to the sound track.

It will be apparent that the parts 3, 4 and 5 can be readily "stamped out" with a sufficiently high degree of accuracy, since the only things requiring great accuracy are the angular relation of the recesses for the lenses in the part 4 which must be accurately perpendicular, and the angular relation of the tongue 8 to the aperture in the member 5, and if these two relations are maintained accurate the entire system will necessarily be in accurate alignment when assembled and inserted in the apparatus. The mounting is therefore extremely inexpensive and easily assembled as well as being highly accurate and the same thing applies to the lenses which, due to the small size of the lens 1 and the desirability of errors in the lens 2 for the reason stated, can both be satisfactorily made from sections of commercial glass rod.

We claim:

1. In a mount for a plurality of cylindrical lenses, a member having a surface shaped to cooperate with a cylindrical face of one of said lenses, a second member having a surface shaped to cooperate with the other cylindrical surface of said lens to retain the said lens against the first member and having a second surface shaped to maintain a second cylindrical lens in predetermined angular relation to said first lens about the optical axis.

2. A mount for a plurality of cylindrical lenses comprising a casing member having a curved pocket for one of said lenses, a second member having a cylindrically curved pocket adapted to cooperate with the first curved pocket in retaining the lens and having a second cylindrically curved pocket adapted to maintain a second lens in predetermined angular relation to said first lens about the optical axis, and a retaining member for holding the two first said parts and the lenses in assembled relation.

3. A mount for a plurality of cylindrical lenses comprising a casing member having a curved pocket for one of said lenses, a second member having a curved pocket adapted to cooperate with the first curved pocket in retaining the lens and having a second curved pocket adapted to maintain a second lens in predetermined angular relation to said first lens, and a retaining member for holding the two first said parts and the lenses in assembled relation, said second member serving as a diaphragm for the first of said lenses and said retaining member serving as a diaphragm for the second of said lenses.

4. An optical system for focussing a narrow line of light upon an image area comprising a cylindrical lens of focal length less than one fifth of an inch whereby its aberrations are small relative to the width of the image to be formed and focussing the image in one direction upon the image area and a second cylindrical lens between the first lens and the light source, and serving as a condenser lens in a direction longitudinal of said first lens.

5. An optical system for focussing a narrow line of light upon an image area comprising a cylindrical lens of focal length less than one fifth of an inch whereby its aberrations are small relative to the width of the image to be formed, and focussing the image in one direction upon the image area and a second cylindrical lens of greater focal length between the first lens and the light source and serving as a condenser lens in a direction longitudinal of said first lens.

6. An optical system for focussing a narrow line of light upon an image area comprising a cylindrical lens of focal length less than one fifth of an inch whereby its aberrations are small relative to the width of the image to be formed and focussing the image in one direction upon the image area and a second cylindrical lens between the first lens and the light source and serving as a condenser lens in a direction longitudinal of said first lens, the axes of said lenses being perpendicular to each other.

7. An optical system for focussing a narrow line of light upon an image area comprising a cylindrical lens of focal length less than one fifth of an inch whereby its aberrations are small relative to the width of the image to be formed and focussing the image in one direction upon the image area and a second cylindrical lens between the first lens and the light source and serving as a condenser lens in a direction longitudinal of said first lens, the axes of said lenses being perpendicular to each other, and a diaphragm adjacent said first lens restricting its aperture to one-third of its diameter.

8. An optical system for focussing a narrow line of light upon an image area comprising a cylindrical lens of focal length less than one fifth of an inch whereby its aberrations are small relative to the width of the image to be formed, and focussing the image in one direction upon the image area and a second cylindrical lens between the first lens and the light source and serving as a condenser lens in a direction longitudinal of said first lens, the axes of said lenses being perpendicular to each other and to the optical axis of the system.

9. An optical system for focussing a narrow line of light upon an image area comprising a cylindrical lens of focal length sufficiently short so that its aberrations are negligible and focussing the image in one direction upon the image area, a second cylindrical lens between the first lens and the light source and serving as a condenser lens in a direction longitudinal of said first lens, said lenses being complete cylinders and the axes of said lenses being perpendicular to each other and to the optical axis of the system, a diaphragm in the form of a slot adjacent said first lens, and a rectangular diaphragm adjacent said second lens.

10. In a mount for a plurality of cylindrical lenses including a member having a recess to seat a face of one of said lenses, a member having a surface shaped to co-operate with a cylindrical face of one cylindrical lens and having its opposite surface shaped to co-operate with a cylindrical face of another lens to maintain the two said lenses in predetermined angular relation about their optical axis, and a retaining member for holding said members and said lenses in assembled relation.

JOHN C. HANSEN.
BURNETTE L. HUBBARD.